US012091892B2

(12) United States Patent
Romero

(10) Patent No.: US 12,091,892 B2
(45) Date of Patent: Sep. 17, 2024

(54) LATCH ASSEMBLY

(71) Applicant: ASSA ABLOY Americas Residential Inc., New Haven, CT (US)

(72) Inventor: Oscar Romero, Lake Forest, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 18/093,954

(22) Filed: Jan. 6, 2023

(65) Prior Publication Data

US 2023/0146406 A1 May 11, 2023

Related U.S. Application Data

(63) Continuation of application No. 16/085,497, filed as application No. PCT/US2017/022282 on Mar. 14, 2017, now Pat. No. 11,598,131.

(Continued)

(51) Int. Cl.
*E05C 3/12* (2006.01)
*E05B 15/04* (2006.01)

(Continued)

(52) U.S. Cl.
CPC .............. *E05C 3/122* (2013.01); *E05B 15/04* (2013.01); *E05B 55/12* (2013.01); *E05B 57/00* (2013.01);

(Continued)

(58) Field of Classification Search
CPC .......... E05B 55/00; E05B 15/04; E05B 55/12; E05B 57/00; Y10T 292/06;

(Continued)

(56) References Cited

U.S. PATENT DOCUMENTS 2,686,071 A * 8/1954 Saxton .................... E05C 19/02 292/71
2,753,201 A * 7/1956 Teetor ..................... E05C 3/162 292/64

(Continued)

FOREIGN PATENT DOCUMENTS

CN 1376232 10/2002
CN 1523186 8/2004

(Continued)

OTHER PUBLICATIONS

PCT International Preliminary Report on Patentability in Application PCT/US2017/022282, mailed Sep. 27, 2018, 12 pages.

(Continued)

*Primary Examiner* — Christine M Mills
*Assistant Examiner* — Faria F Ahmad
(74) *Attorney, Agent, or Firm* — Merchant & Gould P.C.

(57) ABSTRACT

A latch assembly is provided where a latch bolt is moveable to open and close a door by unblocking pivotal movement of the latch bolt. Turning a door knob or door handle does not directly result in a corresponding retraction of the latch within a sleeve, but rather unblocks the bolt to freely pivot away from a latched position. In some embodiments, the latch assembly may include a sleeve that allows for a backset to be infinitely adjusted relative to an aperture of the sleeve. In some embodiments, the latch assembly may further include a dead latch to provide additional security against forced entry.

19 Claims, 16 Drawing Sheets

Related U.S. Application Data

(60) Provisional application No. 62/308,932, filed on Mar. 16, 2016.

(51) Int. Cl.
*E05B 55/12* (2006.01)
*E05B 57/00* (2006.01)

(52) U.S. Cl.
CPC ............... *E05C 3/12* (2013.01); *Y10T 292/06* (2015.04); *Y10T 292/08* (2015.04); *Y10T 292/0977* (2015.04); *Y10T 292/098* (2015.04); *Y10T 292/0982* (2015.04); *Y10T 292/62* (2015.04)

(58) Field of Classification Search
CPC ......... Y10T 292/0802; Y10T 292/0803; Y10T 292/0805; Y10T 292/098; Y10T 292/0982; Y10T 292/0977; Y10T 292/62; Y10T 292/08; E05C 3/12; E05C 3/122
See application file for complete search history.

(56) References Cited

U.S. PATENT DOCUMENTS

| | | | | | |
|---|---|---|---|---|---|
| 3,107,112 | A | * | 10/1963 | Schlage | E05B 15/10 292/192 |
| 3,112,944 | A | * | 12/1963 | Adler | E05B 55/005 292/1.5 |
| 3,912,309 | A | * | 10/1975 | Fischer | E05B 55/005 292/1.5 |
| 3,951,442 | A | | 4/1976 | Schlage | |
| 4,135,746 | A | | 1/1979 | Sterling | |
| 4,248,452 | A | * | 2/1981 | Allenbaugh | E05B 63/0017 70/418 |
| 4,446,707 | A | | 5/1984 | Mullich | |
| 4,573,333 | A | | 3/1986 | Choi | |
| 4,656,849 | A | | 4/1987 | Rotondi | |
| 4,662,665 | A | | 5/1987 | Lin | |
| 4,664,433 | A | | 5/1987 | Solovieff | |
| 4,772,055 | A | | 9/1988 | Fang | |
| 4,840,412 | A | | 6/1989 | Shen | |
| 4,902,057 | A | | 2/1990 | Ching | |
| 4,974,884 | A | | 12/1990 | Dietrich | |
| 4,979,768 | A | | 12/1990 | Marotto | |
| 5,113,676 | A | | 5/1992 | Panossian | |
| 5,149,151 | A | | 9/1992 | Shen | |
| 5,152,558 | A | | 10/1992 | Smith | |
| 5,364,138 | A | | 11/1994 | Dietrich | |
| 5,489,128 | A | | 2/1996 | Florian | |
| 5,501,492 | A | | 3/1996 | Kajuch | |
| 5,516,160 | A | | 5/1996 | Kajuch | |
| 5,613,715 | A | | 3/1997 | Kim | |
| 5,620,211 | A | | 4/1997 | Ellis | |
| 5,897,148 | A | | 4/1999 | Arabia, Jr. et al. | |
| 5,918,916 | A | * | 7/1999 | Kajuch | E05B 63/202 292/169.14 |
| 6,401,297 | B1 | | 6/2002 | Huang | |
| 6,494,504 | B1 | | 12/2002 | Fan | |
| 6,669,246 | B2 | * | 12/2003 | Cowper | E05B 15/10 292/180 |
| 6,722,710 | B2 | * | 4/2004 | Cowper | E05B 63/0017 292/335 |
| 7,393,022 | B1 | | 7/2008 | Shan | |
| 7,695,032 | B2 | * | 4/2010 | Bodily | E05C 1/163 292/DIG. 60 |
| 10,233,673 | B2 | * | 3/2019 | Ramakrishna | E05B 63/06 |
| 10,513,872 | B2 | | 12/2019 | Kumar | |
| 11,220,839 | B2 | * | 1/2022 | Romero | E05C 5/00 |
| 11,598,131 | B2 | | 3/2023 | Romero | |
| 2002/0109360 | A1 | | 8/2002 | Wheatland | |
| 2005/0067843 | A1 | | 3/2005 | Peng | |
| 2006/0208509 | A1 | | 9/2006 | Bodily | |
| 2015/0330100 | A1 | | 11/2015 | Helisten | |
| 2016/0215525 | A1 | * | 7/2016 | Ramakrishna | E05B 63/06 |
| 2018/0328076 | A1 | | 11/2018 | Romero | |
| 2019/0345737 | A1 | * | 11/2019 | Ramakrishna | E05C 1/163 |

FOREIGN PATENT DOCUMENTS

| | | | |
|---|---|---|---|
| CN | 201714147 | | 1/2011 |
| TW | 341265 | U | 9/1998 |
| TW | 345237 | U | 11/1998 |
| WO | 99/64705 | | 12/1999 |
| WO | 03/004813 | | 1/2003 |

OTHER PUBLICATIONS

PCT International Search Report and Written Opinion for PCT/US2017/022282, mailed Jun. 15, 2017, 13 pages.
Taiwanese Search Report for Patent Application No. 106108639, mailed Jun. 28, 2021, 3 pages.

* cited by examiner

LATCH ASSEMBLY

CROSS REFERENCE TO RELATED APPLICATIONS

This application is a continuation of U.S. patent application Ser. No. 16/085,497, now U.S. Pat. No. 11,598,131, filed Sep. 14, 2018, which is a National Stage Application of PCT/US2017/022282, filed Mar. 14, 2017, which claims the benefit of U.S. Provisional Application No. 62/308,932, filed Mar. 16, 2016 which applications are incorporated herein by reference. To the extend appropriate, a claim of priority is made to each of the above disclosed applications.

TECHNICAL FIELD

This disclosure relates generally to latch assemblies; in particular, this disclosure relates to latch assemblies for selectively holding residential and/or commercial doors in a closed position.

BACKGROUND

A latch assembly is used for maintaining a door in a closed position using a bolt that moves between extended and retracted positions. In existing latches, the bolt is actively pushed and pulled between its extended and retracted positions. This pulling and pushing of the bolt requires a certain level of torque for the movement, which can present challenges for certain persons, such as the elderly, to exert sufficient torque to actuate the latch. Poor door preparation and environment factors can exacerbate these difficulties. For example, poor door preparation can create friction between the bolt and strike plate or pocket that increases the torque required to actuate the latch.

Another challenge with existing latches is adjustability. Latches need to fit the backset of the door, which is the distance between the door's edge to the center of the bore hole. Existing latch assemblies have limited adjustability for backset and can typically only be changed between two preset backset dimensions (e.g., 2.375 and 2.75 inches). Therefore, a consumer must determine a backset measurement to properly install a latch, which makes installation more complex and unforgiving to door prep.

SUMMARY

According to the present disclosure, assemblies, components and methodologies are provided for mounting a latch having an infinite backset (between the predetermined standard backsets) that allows opening and closing of doors with minimum application of torque on a door handle. In illustrative embodiments, a latch assembly is provided with a housing and a latch moveable between a latched position with a bolt extending out of the housing and an unlatched position in which the bolt is substantially inside the housing. A latch arm is coupled to the latch and configured to move to permit the latch to move between its latched and unlatched positions. Means for infinitely adjusting the backset is provided so that the lock assembly can be installed in a door without a predetermined backset measurement position. The means for infinitely adjusting the backset may slide along the latch arm along a predetermined path so that the backset can be adjusted to any position along the predetermined path during installation as needed. The means for infinitely adjusting the backset may further comprise a floating latch actuator coupled to the latch arm and an elongated slide opening in the housing, wherein the floating latch actuator is aligned with the elongated slide opening.

In some embodiments, a latch assembly comprises a housing and a bolt that pivots from a latched position during opening of a closed door. The latch arm is coupled to the latch and moves to permit the bolt to pivot from its latched position. In an illustrative embodiment, the latch assembly includes means for unblocking movement of the latch bolt. Once the bolt is unblocked, opening the door away from the door jamb (by pushing/pulling the door) will cause the latch bolt to swing so that the amount of force required to open or unlatch the door is reduced because the bolt will not drag (or apply an opposite force) on the strike on its way out of the strike box. The means for unblocking movement may include a latch actuator with a latch arm receiver sized to receive a portion of a latch arm and a biasing spring configured to bias the latch arm into a blocked position to block movement of the latch bolt. When the latch assembly is unblocked, the bolt is free to rotate when the door is pushed/pulled and a force is applied to the bolt.

In some embodiments, a latch assembly is provided with a housing and a latch that is moveable between a latched position and an unlatched position during opening and closing of a door. The latch assembly may include means for preventing unlatching of the bolt by having a latch arm that blocks pivoting of the bolt in a first position, and allowing unlatching of the bolt in a second position that unblocks the bolt to allow it to freely rotate.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The present disclosure will be described hereafter with reference to the attached drawings which are given as non-limiting examples only, in which.

DETAILED DESCRIPTION OF THE DRAWINGS

The disclosure generally relates to a latch assembly. The latch assembly is disclosed in one embodiment as part of a door handle assembly. The latch assembly as disclosed does not require activation (pull or push of the bolt) directly from the turning action of the door handle. Rather, the door handle will unblock the bolt, thereby allowing the bolt to rotate freely upon pushing or pulling the door. By providing a blocking and unblocking mechanism, rather than a direct translation mechanism that retracts the bolt, a lower torque will be required to release the bolt irrespective of the frictional conditions on the latch assembly. In some embodiments, the latch assembly has an infinite or variable backset that does not require a standardized or predetermined backset to function correctly.

Figure 1:
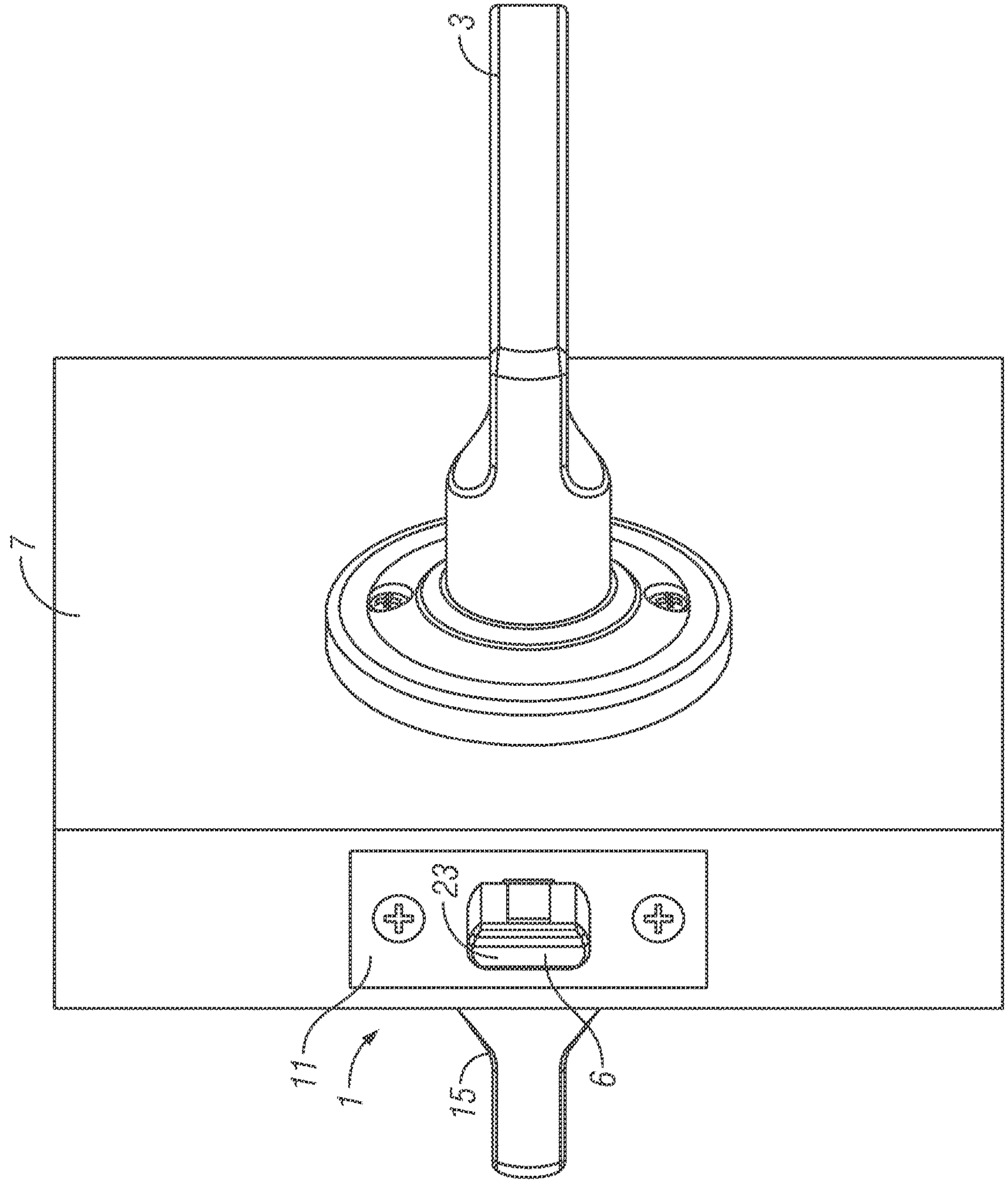
FIG. 1 is a partial view of a door employing a latch assembly according to an embodiment of the disclosure.

FIG. 1 illustrates an example latch assembly 1 according to an embodiment of this disclosure installed in a door 7. In this example, the latch assembly 1 includes a bolt 6 that rotates between a latched position (as shown in FIG. 1) in which the bolt 6 extends from a face plate 11 and an unlatched position (see FIG. 5C) in which an outer end of the bolt 6 moves to a position approximately flush with the face plate 11. When closing the door, the bolt 6 is configured to slide or move inward into the latch assembly 1 when a camming surface of the bolt 6 engages with a door jamb or exterior of a strike plate (not shown) of the door frame, permitting the bolt 6 to move to the unlatched position approximately flush with the face plate 11 to clear the door jamb and enter a pocket (not shown) of the strike plate. After this, the bolt 6 is naturally biased back to the latched position and is retained in the pocket of the strike plate. Before opening the door, the bolt 6 is in the latched position and received in the strike plate pocket. When a force is applied to a flat surface of the bolt 6 (opposite the camming surface) from the door jamb when a user pushes or pulls on the door, the bolt 6, is blocked from moving or pivoting to the unlatched position to keep the door 7 in a closed position. If a user actuates a door knob or handle to open the door, the bolt 6 is unblocked and freely pivots upon the force of the door jamb against the bolt 6 when the user pushes or pulls the door 7.

When opening the door 7, the latch assembly 1 is typically actuated by rotating a door handle, which could be a door knob, door lever, or other handle device. Unlike existing latch assemblies, however, the door handle is used to unblock the bolt 6, which allows the bolt 6 to freely pivot to the unlatched position upon pushing/pulling the door 7, instead of a direct mechanical push/pull translation to extend/retract the bolt. Embodiments are also contemplated in which latch assembly 1 could be employed in an electronic lock in which the latch assembly 1 may be actuated with a motor or other electronically-controlled mechanism to unblock the bolt 6. In this example, there is an exterior door handle 15 and an interior door handle 3 that could each actuate the latch assembly 1 to unblock the bolt 6 to allow opening of the door 7. In this example, the bolt 6 includes an angled surface 23 that slopes toward the exterior door handle 15 and a flat surface 67 that extends generally perpendicular to the latch assembly 1 and faces the interior door handle 3. When the door is being closed, the angled surface 23 acts as a cam with the door jamb (not shown) to move the bolt 6 within the latch assembly 1. When the door is closed, the flat surface 67 acts as a block against the door jamb to prevent the bolt 6 from being moved from engagement with the door jamb when the bolt 6 is blocked from pivotal movement (i.e. prevent the bolt 6 from moving to the unlatched position to permit opening of the door).

Figure 2:
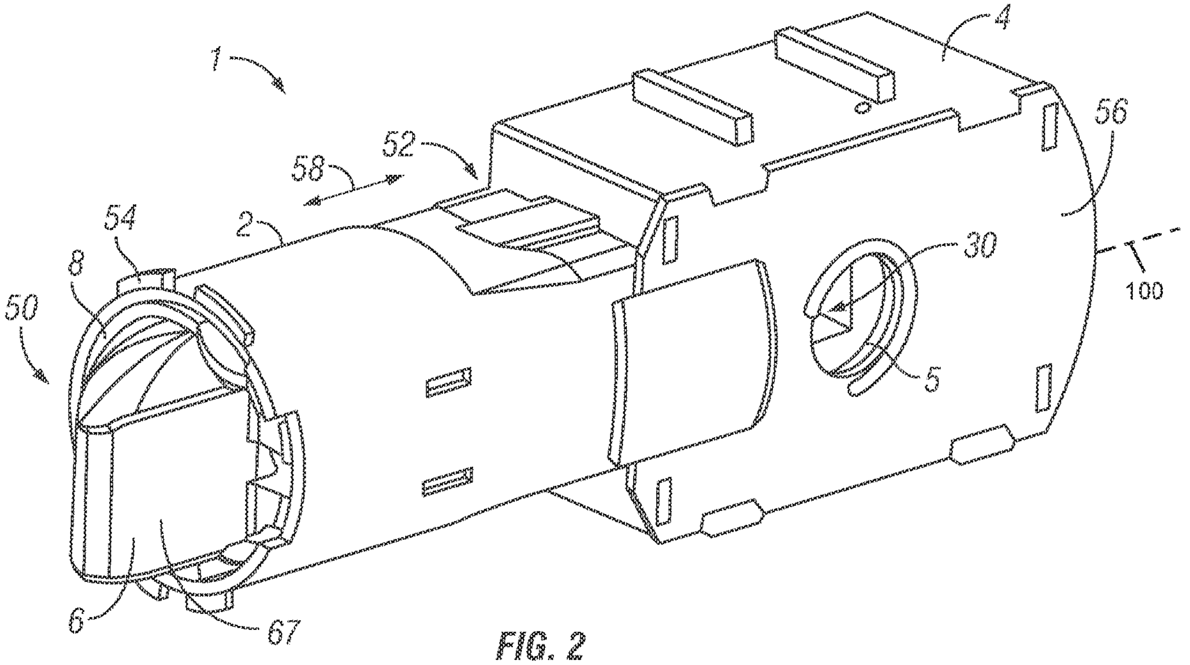
FIG. 2 is a perspective view of a latch assembly according to an embodiment of the disclosure.
Figure 2A:
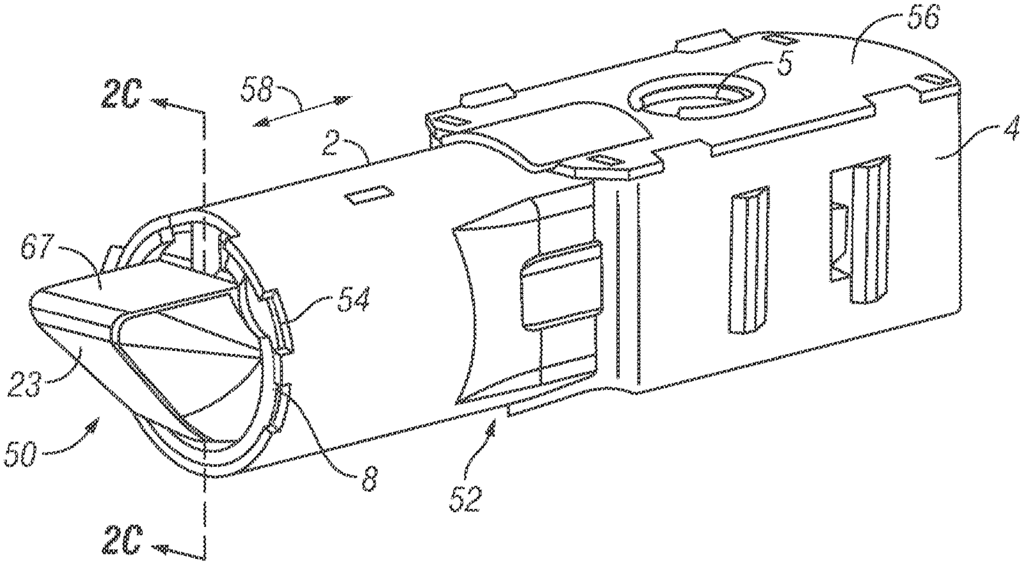
FIG. 2A is a perspective view of the latch assembly of FIG. 2 rotated ninety-degrees counter-clockwise along its longitudinal axis to show additional components.

FIGS. 2 and 2A show the example latch assembly 1 of FIG. 1 prior to installation in the door 7. FIG. 2A is a perspective view of the latch assembly of FIG. 2 rotated ninety degrees counter-clockwise along its longitudinal axis 100 to show additional components. As shown, the latch assembly 1 includes a sleeve 2 that is slidably coupled with a cartridge 4. When the latch assembly 1 is installed, the sleeve 2 and cartridge 4 are primarily disposed in the cross bore (not shown) in the door 7. As shown, the sleeve 2 has an open first end 50 and a second end 52 extending into the cartridge 4. The bolt 6 extends out of the sleeve 2 in its latched position (as shown) and is blocked from pivoting to keep the door closed as discussed below. When a user wants to open the door, actuating the door handle unblocks the bolt 6 so it can freely pivot to an unlatched position inside the sleeve 2 as the door is pushed/pulled. In this example, the sleeve 2 includes a radially extending flange 54 on its first end 50, which could aid in maintaining a position of the sleeve 2 in the cross bore of the door 7. The cartridge 4 includes side walls 56 that define a bore 5 through which the torque blade (not shown) of the door handle 3, 15 would extend to actuate the latch assembly 1. In the example shown, the bore 5 is coaxial with a spindle receiver 30 (see also FIG. 3B) to receive a torque blade of door handle 3, 15 that can be used to unblock the bolt 6. In the example shown, the sleeve 2 is slidably coupled with a cartridge 4 to adjust backset of the latch assembly 1. As shown, the sleeve 2 is slidable with respect to cartridge 4 along line 58 to adjust backset. Unlike existing latches that can only be selected between two predetermined backsets (i.e., 2.375 inches or 2.75 inches), the sleeve 2 is slidable to be infinitely adjustable by sliding the sleeve 2 with respect to the cartridge 4.

For example, the backset could be infinitely adjusted between a first backset and a second backset, which could be predetermined standard backsets.

Figure 2B:
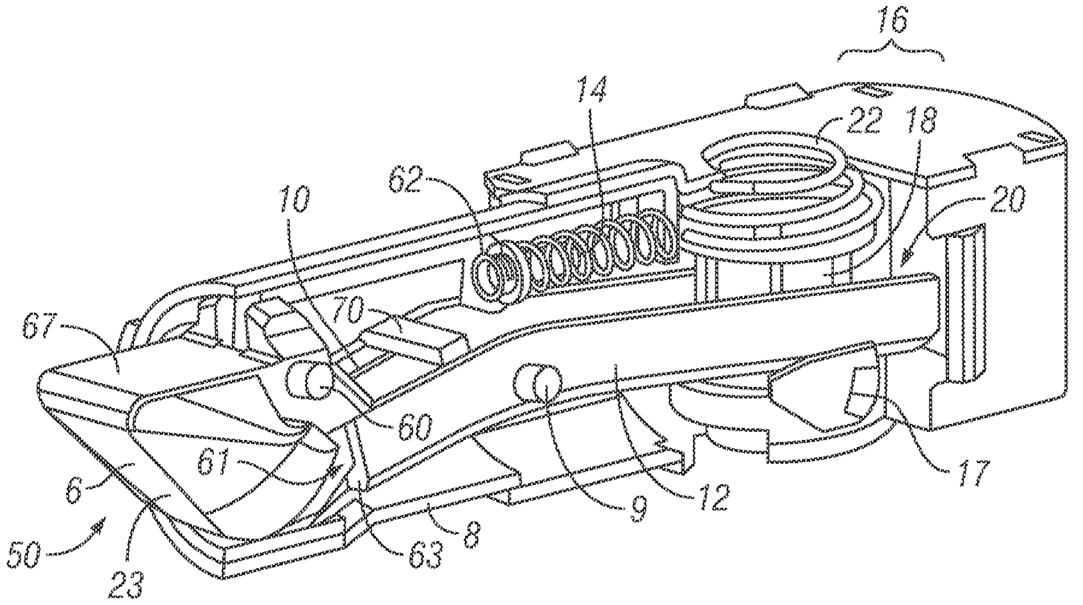
FIG. 2B is the latch assembly of FIG. 2A with the sleeve partially cut away to show internal components.
Figure 2C:
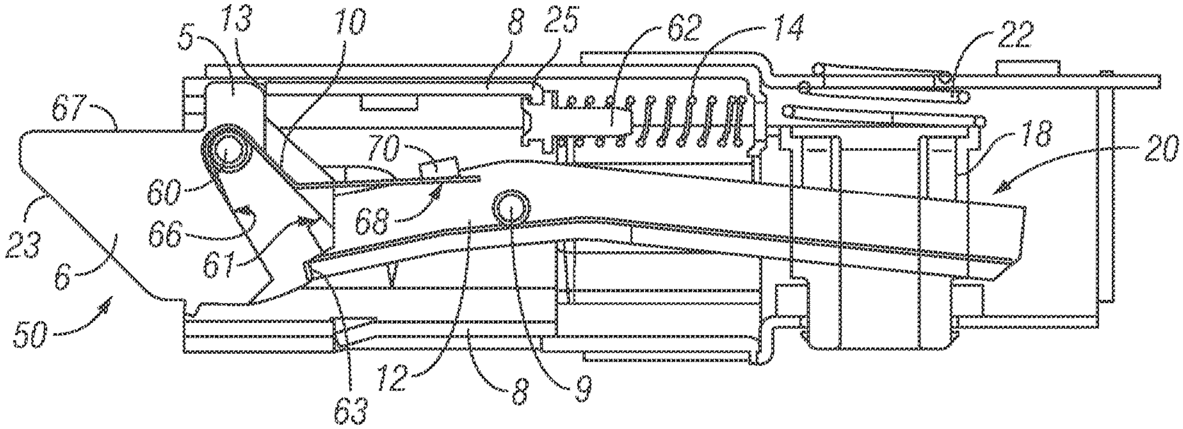
FIG. 2C is a cross-sectional view taken along the line 2C-2C of FIG. 2A.

Referring now to FIGS. 2B-2C, the latch assembly includes an inner sleeve 8 that is generally concentric with and slidably coupled with the sleeve 2. The inner sleeve 8 is movable between an extended position and a retracted position. In the extended position (shown in for example FIGS. 2A, 2C and 5A), the inner sleeve 8 has a proximal end 13 that is generally flush with the open first end 50 of the sleeve 2. In the retracted position, the inner sleeve 8 slides toward the second end 52 of the sleeve 2 (see FIGS. 5B and 5C). A distal end 25 of inner sleeve 8 is urged by a push spring 14 towards its extended position. In one embodiment shown, a pin 62 extends from the inner sleeve 8 and receives the push spring 14. As illustrated for example in FIG. 2C, the bolt 6 includes a protrusion 5 that is configured to abut against the proximal end 13 of the inner sleeve 8. Alternatively, another portion of the bolt 6 may be configured to interact with the proximal end 13 of the inner sleeve 8. When the door is being closed, the angled surface 23 of the bolt 6 acts as a cam with door jamb, causing the bolt 6 to move away from the latched position and apply an inward force to the inner sleeve 8. This inward force upon the inner sleeve 8 overcomes the urging of the push spring 14 and moves the inner sleeve 8 to its retracted position. As the door continues to close, the bolt 6 will align with an opening in the strike plate (not shown). When this happens, no camming force will be applied to the bolt 6, its protrusion 5, or the inner sleeve 8. The push spring 14 will accordingly urge the inner sleeve 8 back to its extended position, which moves the bolt to its latched position within the strike plate. Accordingly, the bolt 6 is urged towards its latched position by the urging of the push spring 14 on the inner sleeve 8 when the door is closed.

In the example shown, the bolt 6 is pivotally connected to the inner sleeve 8 with a pivot pin 60. The bolt 6 is configured to at least partially pivot about the pivot pin 60 between its latched and unlatched positions when the door is being opened (e.g. when the bolt 6 is being moved out of engagement with the door jamb/strike plate of the door). A latch arm 12 selectively blocks pivoting of the bolt 6. In the embodiment shown, the latch arm 12 has a proximal end 61 and a distal end 20. The proximal end 61 includes a blocking surface 63 that is movable between a blocked position (as shown in for example FIG. 2C) that blocks rotation of the bolt 6 about pivot pin 60 and an unblocked position that does not restrict rotation of the bolt 6 (see for example FIG. 6A). The blocking surface 63 moves between the blocked position and the unblocked position based on a position of the distal end 20 of the latch arm 12 relative to other components such as the cartridge 4.

Figure 5A:
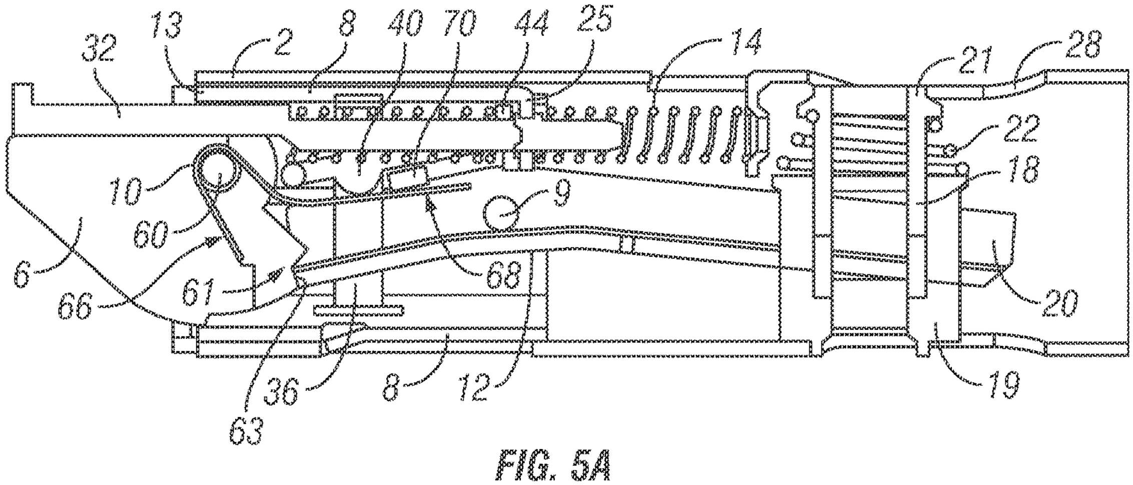
FIG. 5A is a side cross-sectional view of the latch assembly shown in FIG. 4A.
Figure 6A:
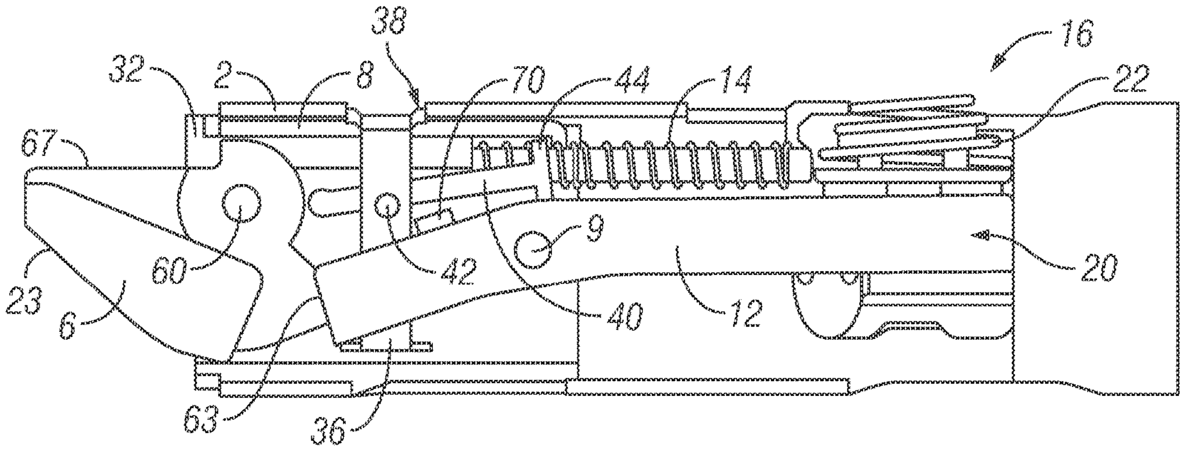
FIG. 6A is a partial cross-section of a latch assembly with a dead lock during door opening.
Figure 6B:
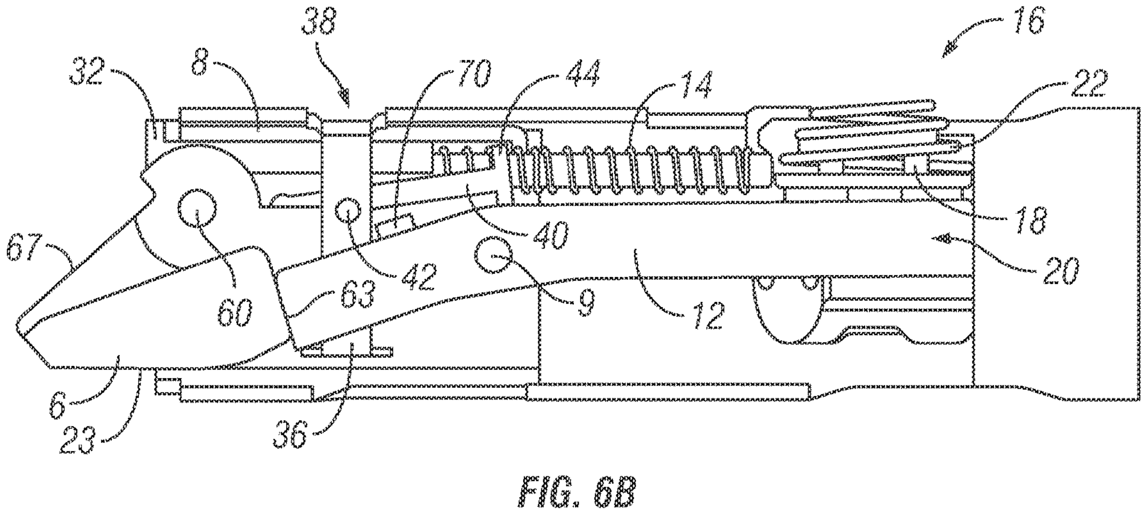
FIG. 6B illustrates the latch assembly of FIG. 6A showing free rotation of the bolt while the dead lock is simultaneously deactivated by the arm.
Figure 6C:
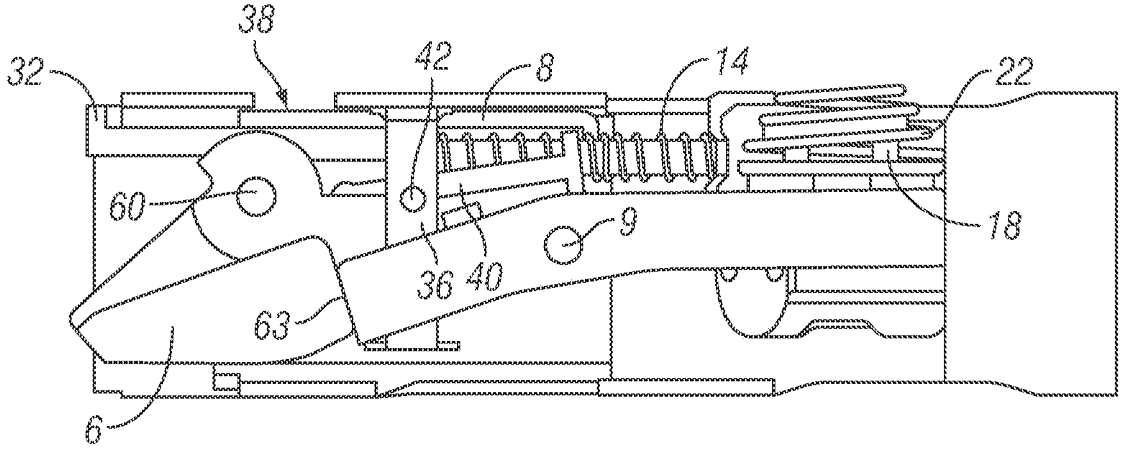
FIG. 6C illustrates the latch assembly of FIG. 6A showing the bolt position when clearing the door frame during door opening while the dead lock remains deactivated.
Figure 6D:
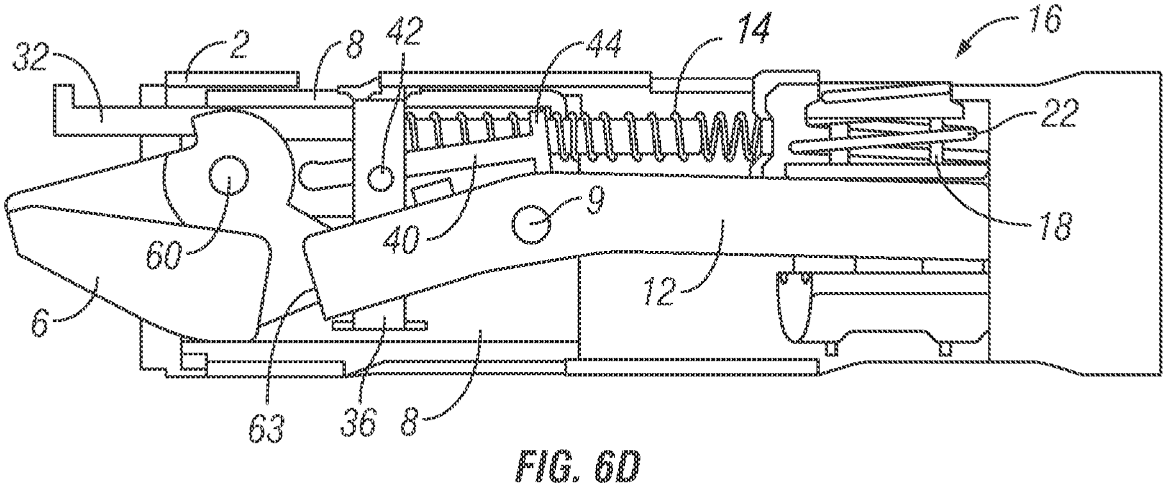
FIG. 6D illustrates the latch assembly of FIG. 6A after the door has been opened.

As explained below, when a door handle is rotated to open the door, a torque blade (not shown) of a door handle will move the distal end 20 of the latch arm 12 from a first position (as shown for example in FIGS. 3C and 5A) in which the blocking surface 63 prevents pivotal rotation of the bolt 6 to a second position (as shown in FIGS. 6A-6C) in which the blocking surface 63 allows the bolt 6 to rotate freely when the door is pushed/pulled. In particular, the force of the door jamb on the flat surface 67 of the bolt 6 will overcome the urging of a spring return 10 to pivot the bolt 6 within the sleeve 8, as discussed below. In the example shown, the arm 12 is pivotally connected to the inner sleeve 8 by a pin 9, which allows the latch arm 12 to pivot about pin 9 between the first position and the second position. Unlike existing latch assemblies, which retract the bolt by direct translation of the door handle, the door handle 3, 15, in the present disclosure the latch assembly 1 only moves the latch arm 12 to block or unblock the bolt 6 so that it can freely pivot. Accordingly, in the present latch assembly 1, actuation of the door handle 3, 15 does not to retract the bolt 6; instead, the door handle 3, 15 is merely used to move the latch arm 12 to block or unblock the bolt 6.

In the embodiment shown, a spring return 10 urges the bolt 6 to the latched position in which the bolt 6 extends out of the open end of the sleeve 2. As shown, the spring return 10 is coupled with the pin 60 and has a first end 66 engaged with the bolt 6 and a second end 68 engaged with a cross-member 70 of the latch arm 12. With this configuration, the first end 66 of the spring return 10 urges the bolt 6 towards the latched position extending out of the sleeve 2. Accordingly, when the latch arm 12 moves to the second position in which the bolt 6 is unblocked, when the user pushes/pulls the door 7, this force on the flat surface 67 of bolt 6 will overcome the urging of the spring return 10 to pivot the bolt 6 within the sleeve 2. As the door continues to open and the bolt 6 clears the door jamb, no additional force will be applied to the bolt 6, and the spring return 10 will naturally urge the bolt 6 back to the latched position in which the bolt 6 extends out of the sleeve 2.

As illustrated, for example, in FIGS. 2B and 2C, the distal end 20 of the arm 12 may be engageable by a floating latch actuator 16 in the cartridge 4 that is engaged by the rotation of the torque blade to cause movement of the latch arm 12. In one embodiment, the floating latch actuator 16 includes an arm receiver 18 for receiving the arm 12 and a bias spring 22. The arm receiver 18 is movable when the torque blade is turned to cause the arm 12 to be moved to an unblocked position. The bias spring 22 urges the arm receiver 18 to a position that moves the arm 12 to a blocked position that prevents rotation of the bolt 6 about the pivot pin 60. The blocked position is shown in FIGS. 2B and 2C. Here, the bolt 6 is shown fully extended and blocked from moving distally inside the sleeve 2. In this position, the blocking surface 63 of the arm 12 prevents free rotation of the bolt 6. The spring return 10, a torsion spring in the embodiment shown, urges the bolt 6 in the position illustrated. In various embodiments, the arm receiver 18 may further include an upper block 21 and a lower block 19. The distance between the upper block 21 and the lower block 19 may be variable as the arm receiver 18 moves within the cartridge 4.

In an illustrative embodiment, the arm receiver 18 may be moveable via a camming action when the arm receiver 18 is rotated upon opening the door. For instance, in one embodiment, the arm receiver 18 may float in and be movable relative to a cam block 17 (see FIG. 2B) that interacts with the distal end 20 of the arm 12. When a torque blade of the door handle rotates the arm receiver 18, the cam block 17 may cam the distal end 20 of the arm 12 against the bias of the bias spring 22 to unblock the bolt 6. In particular, this camming action causes the arm 12 to pivot against the urging of the bias spring 22 about the pin 9 to a position in which the blocking surface 63 does not prevent pivoting of the bolt 6. In opening the door, a torque blade of the door handle will unblock or activate the floating latch actuator 16 to move the arm receiver 18 relative to the cam block 17 and compress the bias spring 22, which moves the blocking surface 63 away from the bolt 6. The arm receiver 18 could be moved by a camming mechanism wherein rotation of the arm receiver 18 cams out of cam block 17 to push the arm receiver 18 up against and compress the bias spring 22. This raises the distal end 20 of the arm 12, which in turn lowers the proximal end 61 of the arm 12 near the bolt 6, allowing the bolt 6 to rotate against a strike plate (not shown).

Figure 7:
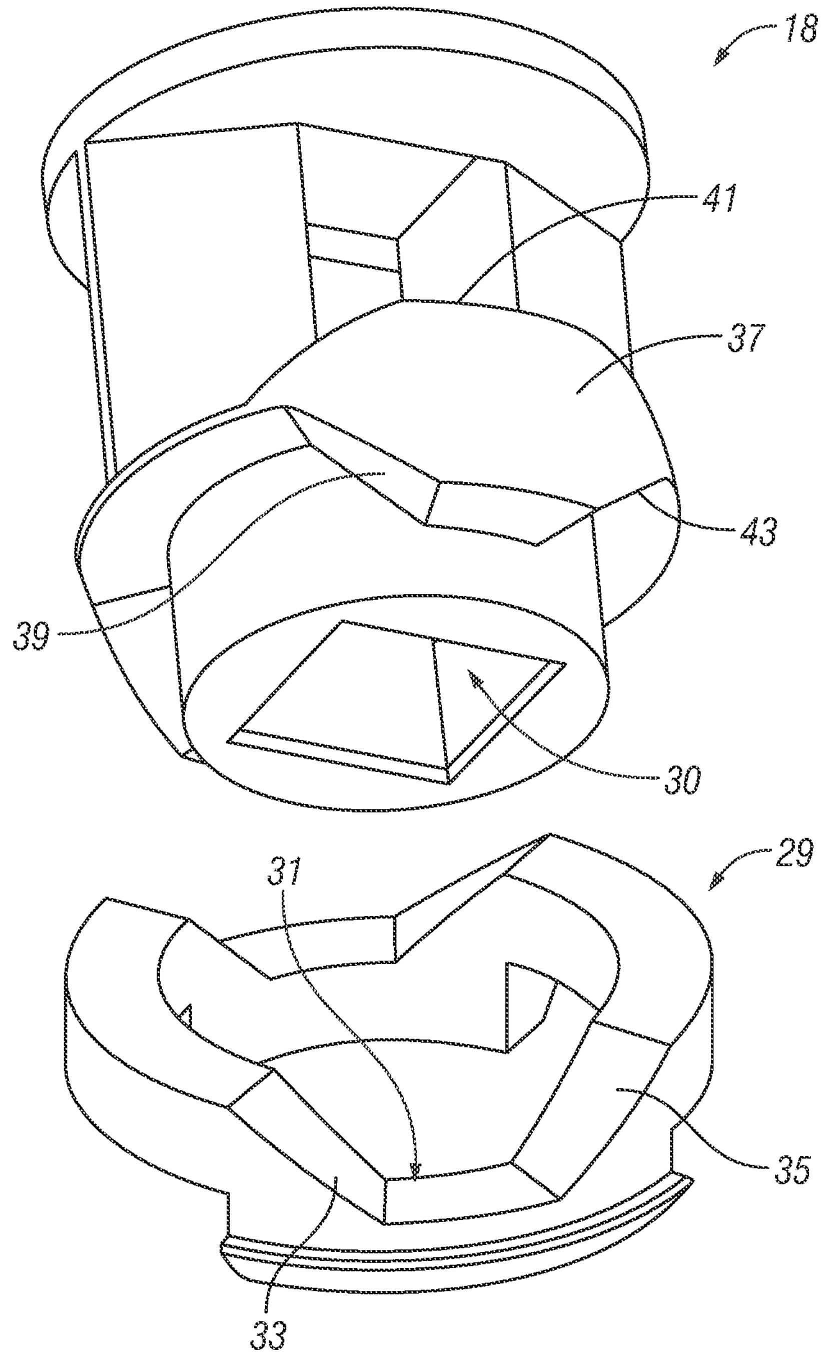
FIG. 7 illustrates an exploded view of a camming assembly for a latch assembly according to an embodiment of the disclosure.
Figure 8A:
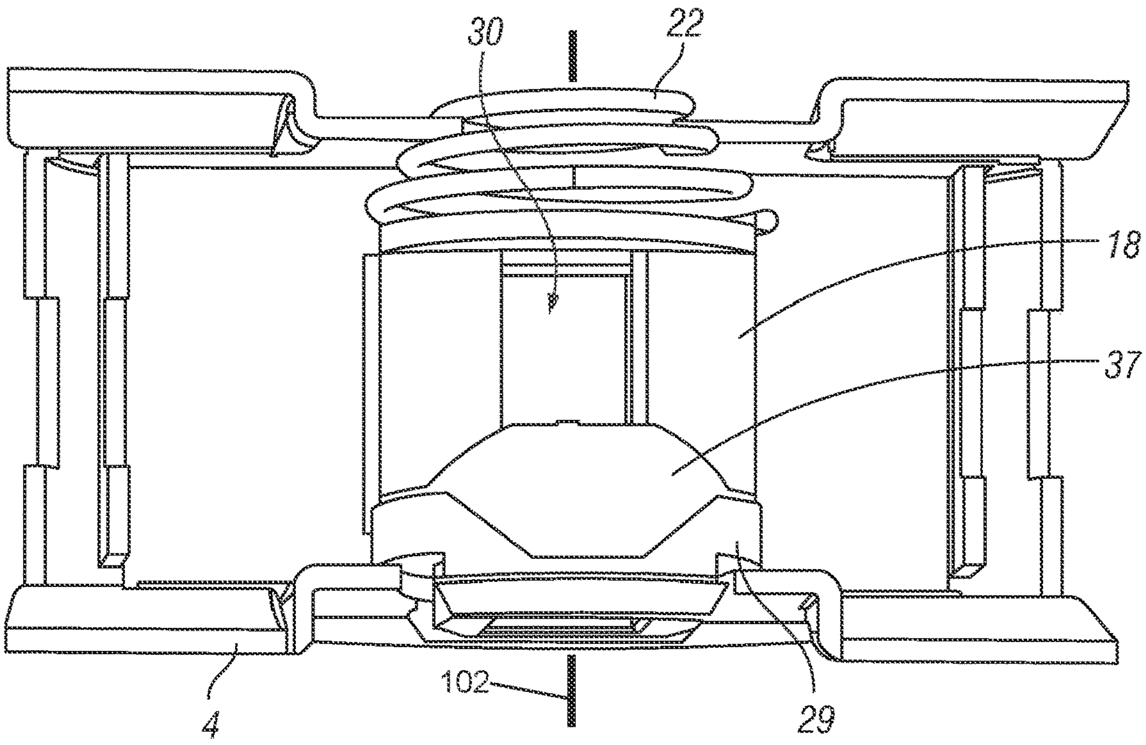
FIG. 8A illustrates a partial cross-sectional view of a latch assembly including the camming assembly of FIG. 7 before operation of a door opening.
Figure 8B:
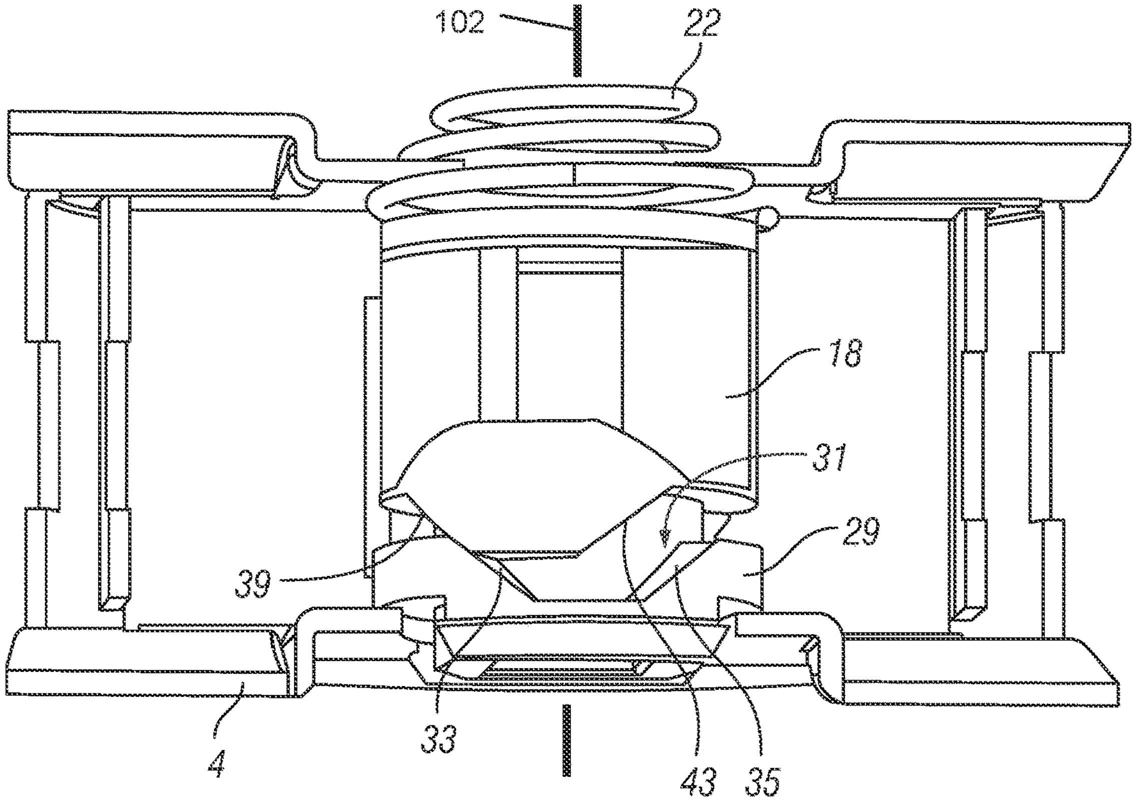
FIG. 8B illustrates a partial cross-sectional view of the latch assembly of FIG. 8A after a door handle has been rotated.
Figure 9:
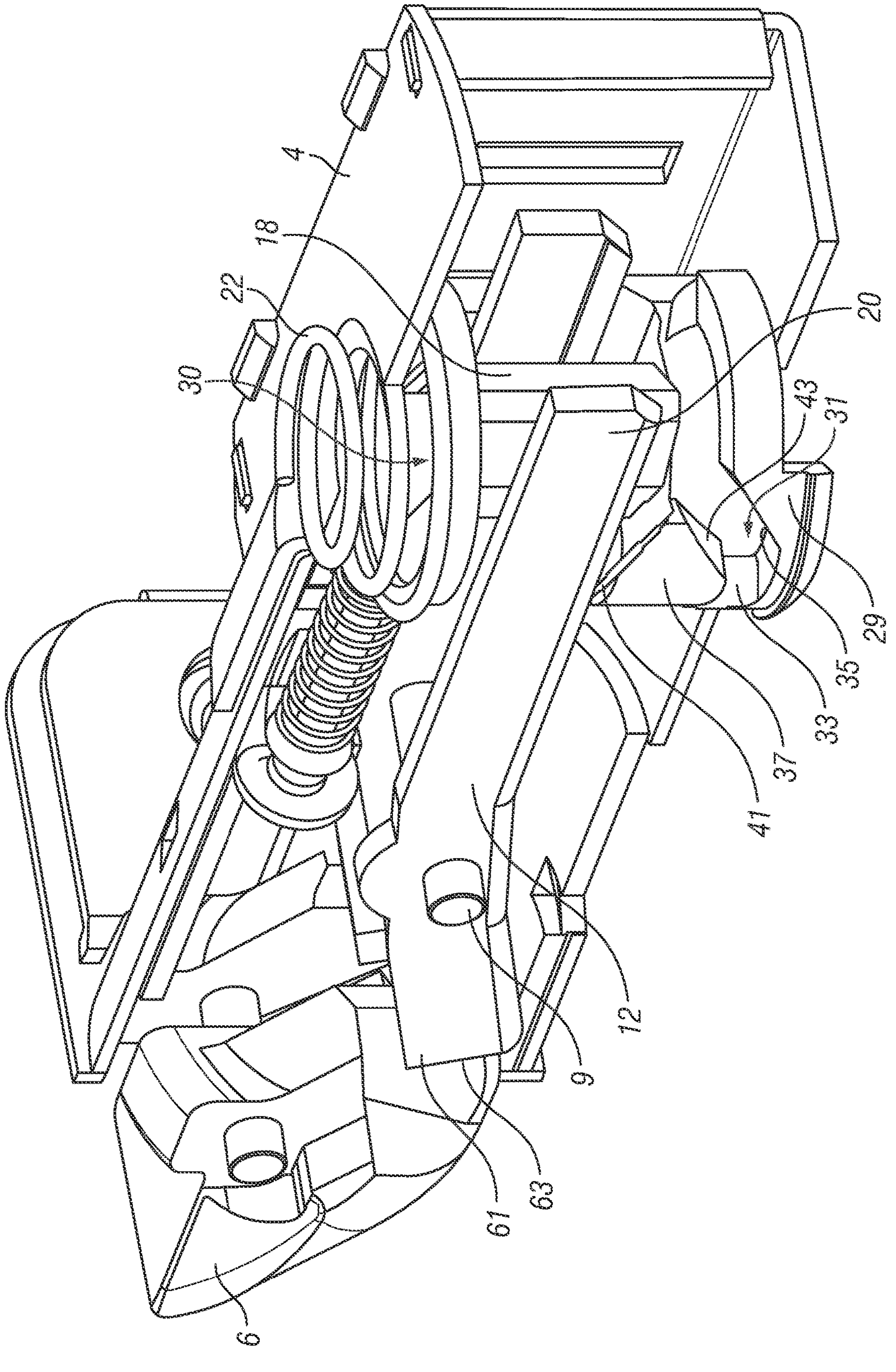
FIG. 9 illustrates a perspective cross-sectional view of a latch assembly including the camming assembly of FIG. 7 after rotation of a door handle.

In various embodiments, the arm receiver 18 may be engaged with a cam plug 29 that is fixed to a bottom surface of the cartridge 4. The cam plug 29 is secured to the cartridge and does not rotate, but includes one or more surfaces that interact with the arm receiver 18 when the arm receiver 18 rotates. As illustrated in FIGS. 7-9, the cam plug 29 may be formed to include a lobe-receiving groove 31 defined by a first angled surface 33 and a second angled surface 35. The lobe-receiving groove 31 is configured to receive and mate with a lobe 37 on an outer circumferential surface of the arm receiver 18 (for instance, on the lower block 19) to retain the arm receiver 18 in the position where the arm receiver 18 maintains the latch arm 12 in the blocked position. In various embodiments, there may be two or more lobes 37 on the arm receiver 18 that engage with two or more lobe-receiving grooves 31 of a cam plug 29. The bias spring 22 is configured to urge the arm receiver 18 downward, thereby naturally urging the lobe 37 into mating engagement with the lobe-receiving groove 31. When the arm receiver 18 is rotated by operation of the door handle (via, for example, force from the torque blade 102 shown in FIGS. 8A and 8B received in a spindle receiver 30 of the arm receiver 18), a camming surface 39 of the lobe 37 engages with the first angled surface 33 of the lobe-receiving groove 31 to slide the lobe 37 at least partially out of the lobe-receiving groove 31. The camming surface 39 and first angled surface 33 are configured to mate and match against each other to perform this operation. This operation causes the arm receiver 18 to move upward toward the bias spring 22. As illustrated in FIG. 9, the latch arm 12 may abut against a ride surface 41 of the arm receiver 18 to also move upward to the unblocked position. When force is no longer applied to the arm receiver 18 via the torque blade, the bias spring 22 will naturally bias the arm receiver 18 downward, causing the lobe 37 to slide along the first angled surface 33 back into full engagement with the lobe-receiving groove 31 of the cam plug 29. As can be understood, a similar, but opposite, process may cause a second camming surface 43 of the lobe 37 to slide along the second angled surface 35 to raise the latch arm 12 with an opposite turn of the torque blade. Other embodiments of moving the arm receiver 18 upward upon rotation of a torque blade are envisioned herein. For instance, the arm receiver 18 may include one or more camming surfaces 39 and 43 or one or more ride surfaces 41 and 43 that cause a camming action but are not part of or connected to a lobe 37 or other similar feature.

When the door is being closed, the angled surface 23 of the bolt 6 acts as a cam against the door jamb. This allows the inner sleeve 8 to slide further inside the sleeve 2 against the biasing of the push spring 14 to clear the door jamb for opening the door. Although the push spring 14 is shown as a spring that lies on a side of arm 12, it may be a larger spring that completely surrounds arm 12 and lies in axial alignment with inner sleeve 8 to provide equal force and equal biasing of the sleeve 8 to the extended position towards proximal end of the sleeve 2.

Figure 3:
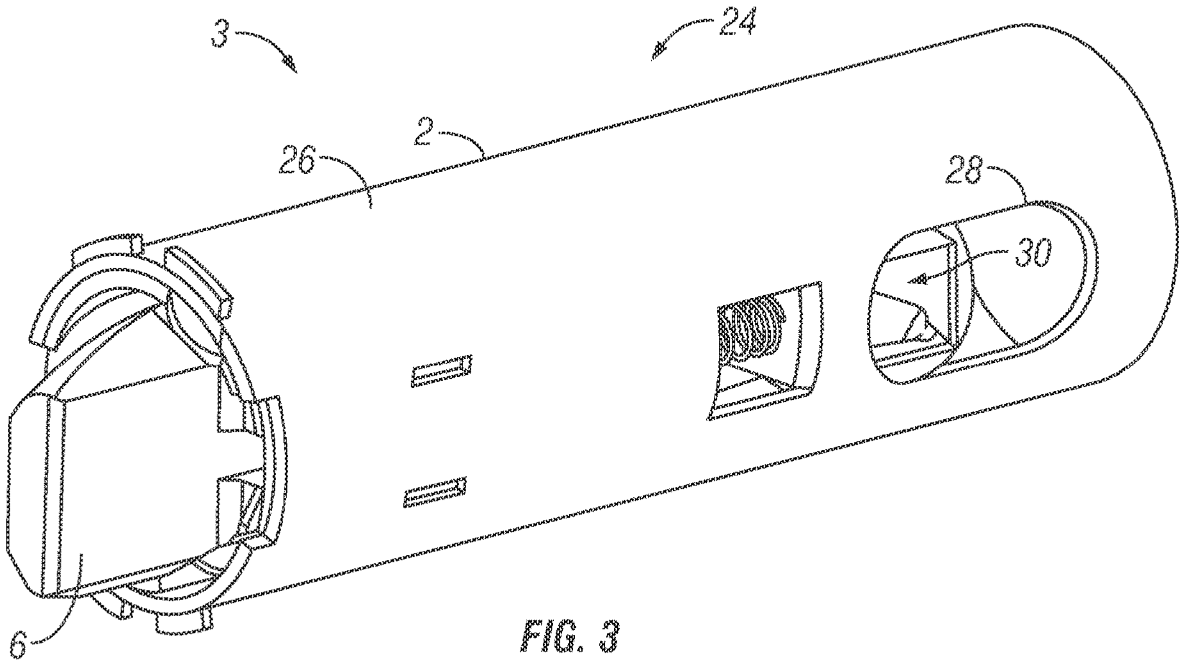
FIG. 3 is a perspective view of a latch assembly according to an another embodiment of the disclosure.
Figure 3A:
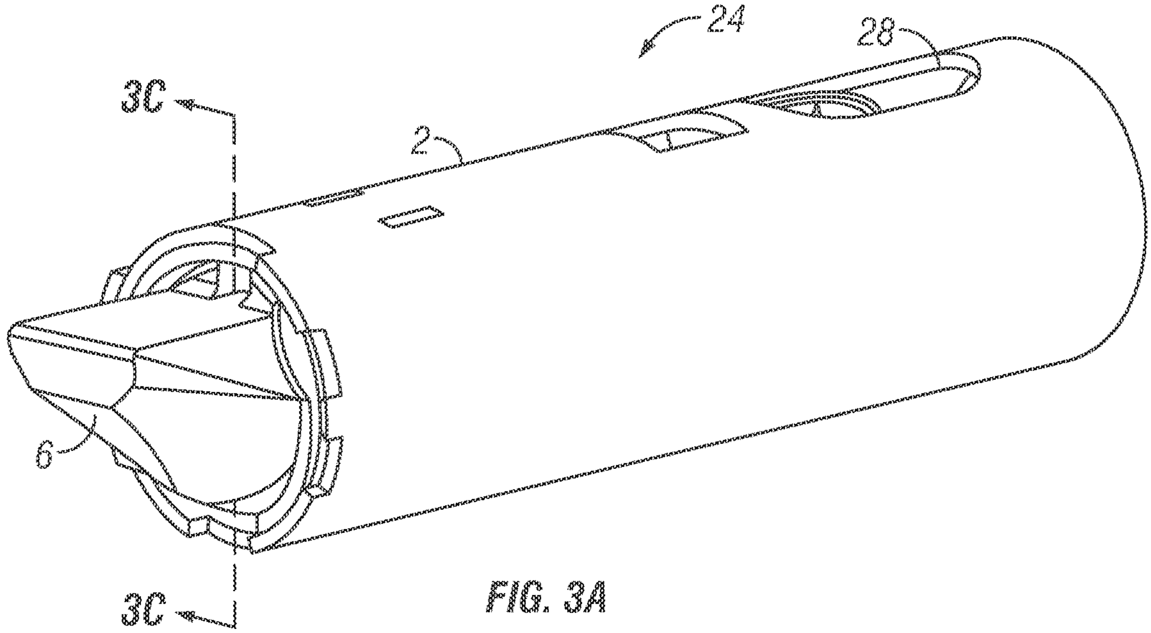
FIG. 3A is a perspective view of the latch assembly of FIG. 3 rotated ninety-degrees counter-clockwise along its longitudinal axis to show additional components.

FIG. 3 shows an embodiment of a latch assembly 24 that comprises a monolithic housing 26 assembly including a sleeve 2 and bolt 6. In this embodiment, the sleeve 2 defines an elongated opening 28 that allows for an infinite or variable backset by adjusting the position of a spindle receiver 30. The spindle receiver 30 may “float” or be translated along elongated opening 28 to any point along the opening, wherein the spindle receiver 30 aligns with the opening 28 to receive the torque blade of door handle 3, 15. Therefore, the backset does not have to be predetermined, preset, or accurately measured to precisely align with a point in a bore hole of a door (not shown) before installation of the latch assembly 24 into the door.

Figure 3B:
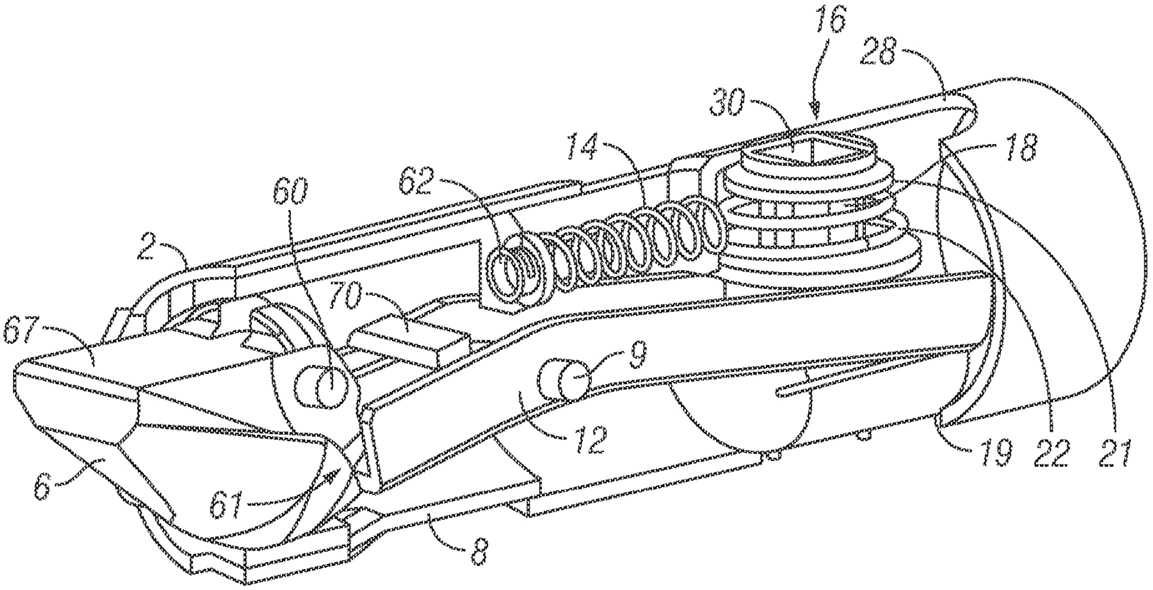
FIG. 3B is the latch assembly of FIG. 3A with the sleeve partially cut away to show internal components.
Figure 3C:
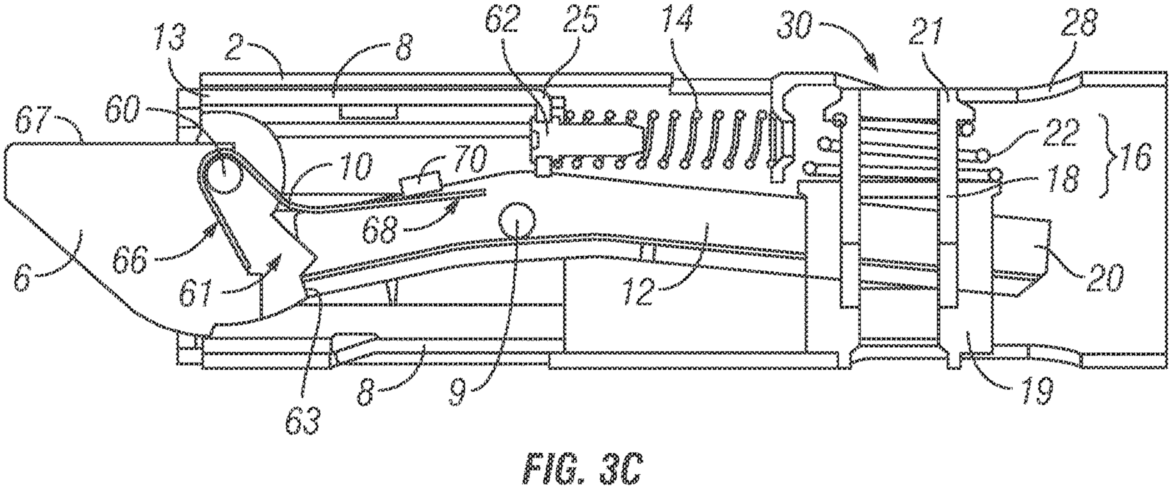
FIG. 3C is a cross-sectional view taken along the line 3C-3C of FIG. 3A.

FIGS. 3B and 3C show cut-away and sectional views, respectively, of the monolithic assembly of FIG. 3 to show internal components. Similar reference numbers in the monolithic housing assembly that are not discussed herein function the same as the corresponding components in the cartridge assembly described above with respect to FIGS. 2A-2C. As shown, the floating latch actuator 16 includes an arm receiver 18 and bias spring 22. In this embodiment, the bias spring 22 is located between the upper block 21 of the arm receiver 18 and the lower block 19 of the arm receiver 18. In this embodiment, when the door is being opened, turning the door handle causes a pushing actuation force to be exerted on the lower block 19 to compresses the bias spring 22 and pivots the distal end 20 of the arm 12 about the pin 9. This pivoting action moves the blocking surface 63 away from the bolt 6, thereby allowing free rotation of the bolt 6. When the user opens the door, the force of the door jamb on the flat surface 67 of the bolt 6 will overcome the urging of the spring return 10 to allow pivoting of the bolt 6 about the pin 60.

FIGS. 4A-7E illustrate an embodiment of the monolithic housing latch assembly 24 incorporating a dead latch 32. Although depicted in the monolithic housing, the dead latch 32 as will be described in the following figures may also be incorporated into the latch assembly 1 with the cartridge 4. In the embodiment shown, the dead latch 32 extends from the sleeve 2 along with the bolt 6 to provide additional security against forced entry via, for example, a knife or credit card. Similar reference numbers in this embodiment that are not discussed herein function the same as the corresponding components in the assemblies described above.

Figure 4A:
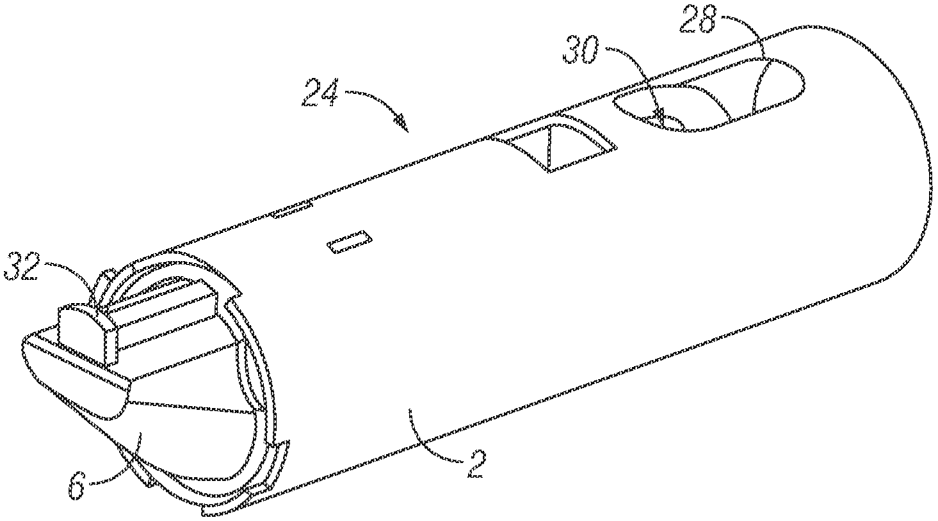
FIG. 4A is a perspective view of a latch assembly according to an embodiment of the disclosure having a dead latch.
Figure 4B:
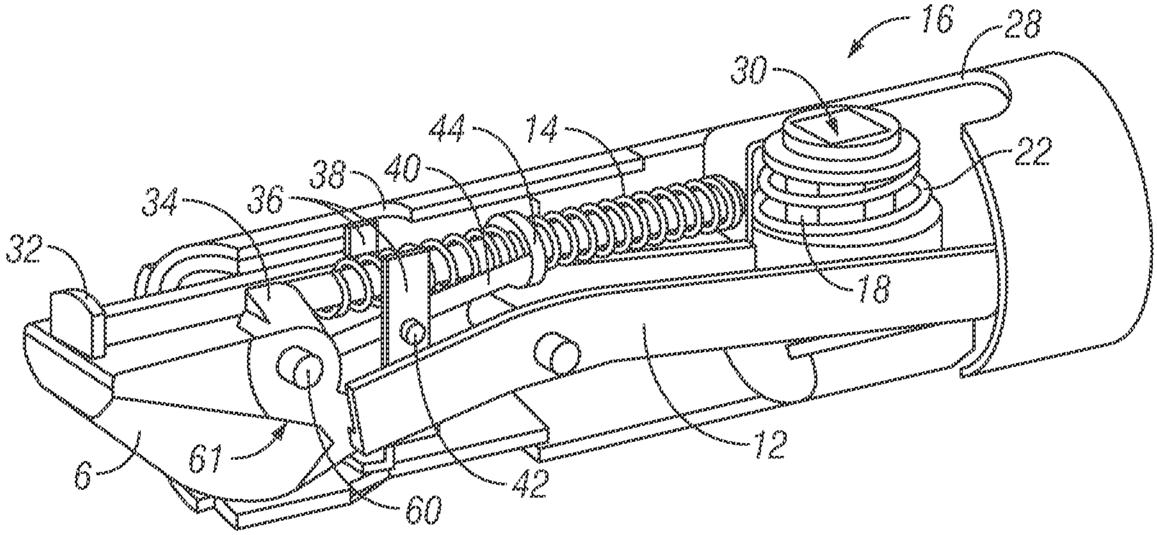
FIG. 4B is the latch assembly of FIG. 4A with the sleeve partially cut away to show internal components.
Figure 4C:
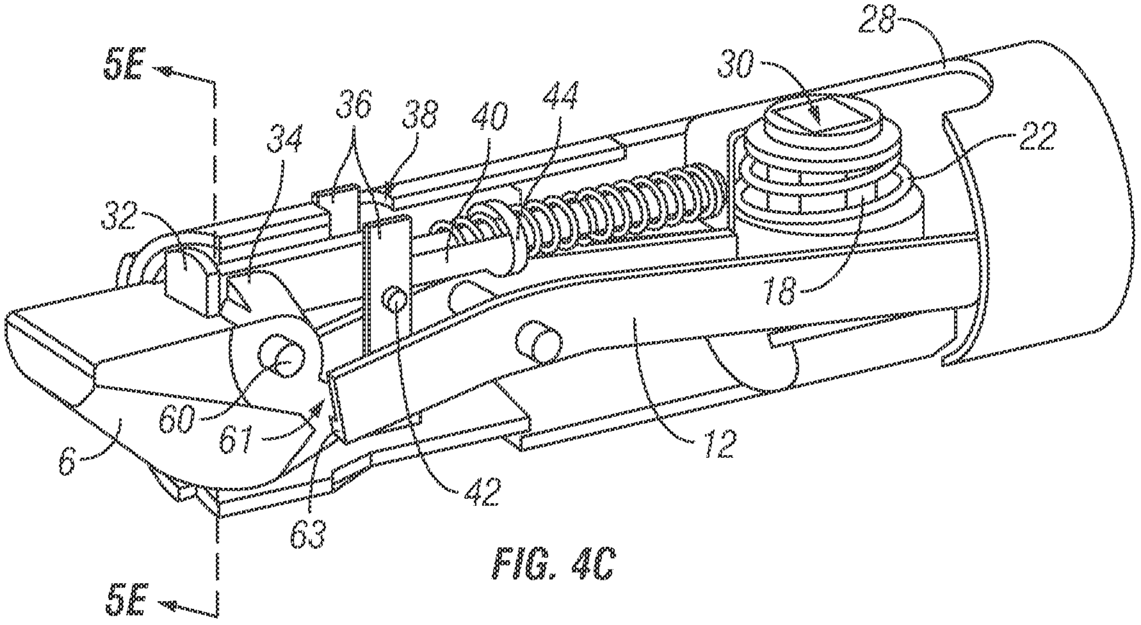
FIG. 4C is the latch assembly of FIG. 4B showing the dead latch in the blocking position.

In the example shown, the dead latch 32 is located between guide prongs 34 of the bolt 6 and, when fully extended, has an end that is flush with a proximal end of the bolt 6. As shown, the dead latch 32 is coupled to the arm 12 via a U-shaped blocker 36 and a lock lever 40. The lock lever 40 has a dead latch receiver 44 for a distal end of the dead latch 32 to be received. The lock lever 40 is connected to and pivotable relative to the blocker 36, via pivot points 42 formed in each side of the U-shaped blocker 36. In this embodiment, the sleeve 2 and inner sleeve 8 each include blocker receiver openings 38 through which the ends of the blocker 36 may extend to block translation of the inner sleeve 8 and free rotation of bolt 6 when activated as best seen in FIG. 4C, for example.

Figure 5B:
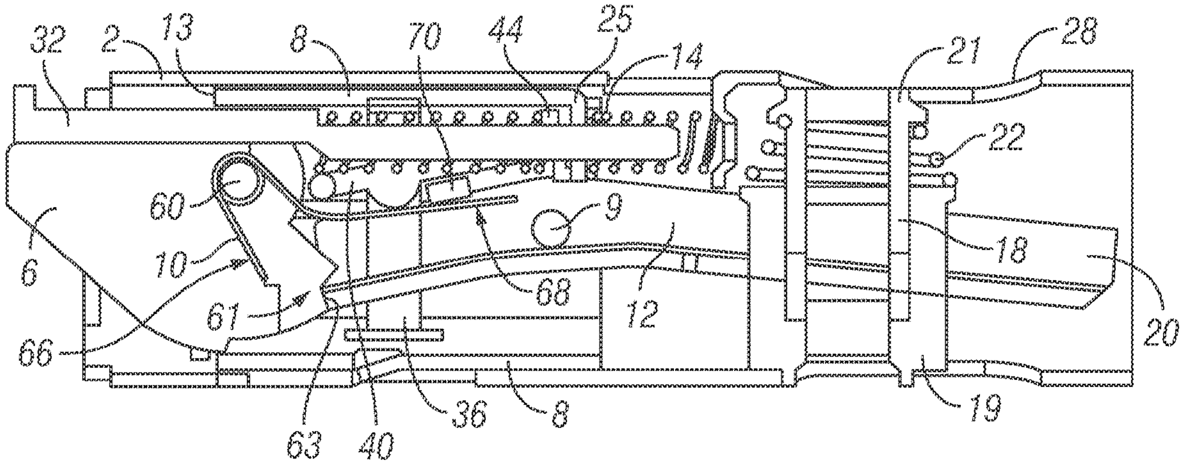
FIG. 5B is a side cross-sectional view of the latch assembly shown in FIG. 4A during door closing.
Figure 5C:
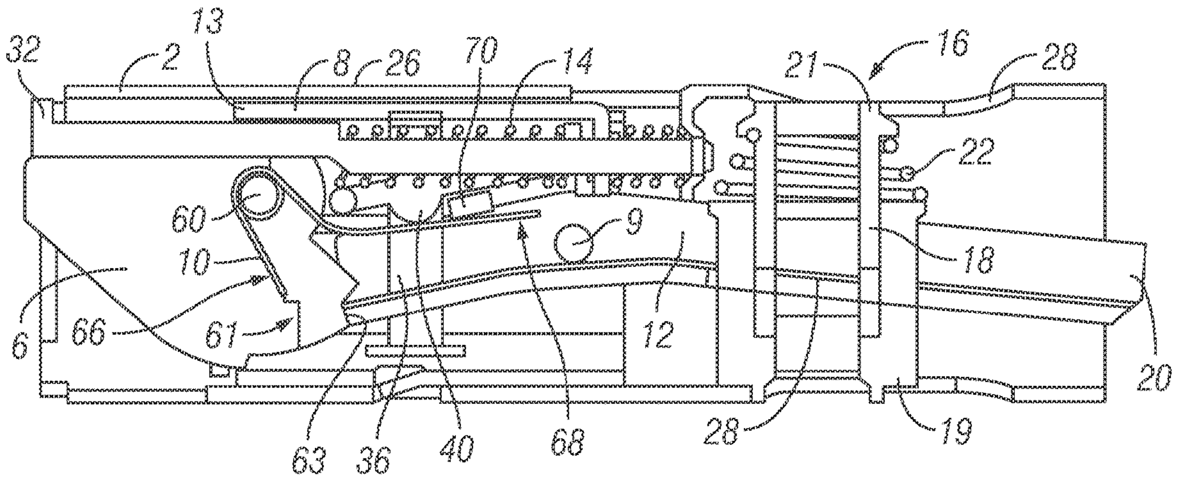
FIG. 5C is a side cross-sectional view of the latch assembly shown in FIG. 4A upon door closing.
Figure 5D:
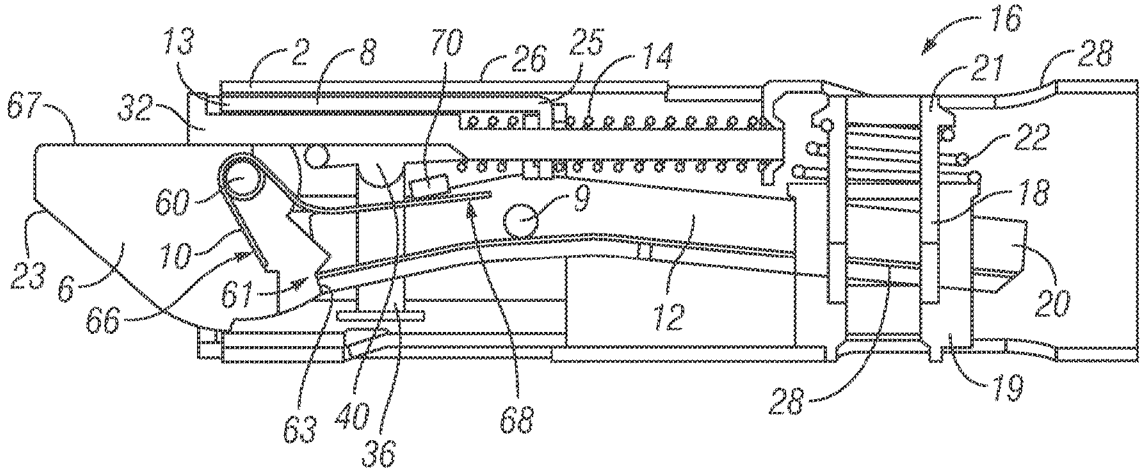
FIG. 5D is a side cross-sectional view of the latch assembly shown in FIG. 4A showing dead lock activation.
Figure 5E:
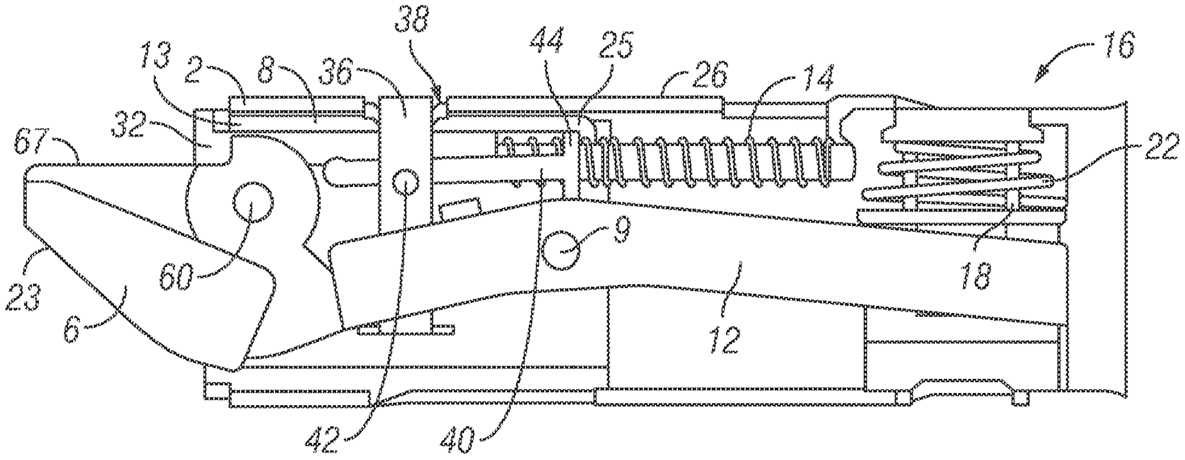
FIG. 5E illustrates another view of the latch assembly taken along 5E-5E of FIG. 4C showing dead lock activation.

As seen in FIGS. 5A-5B, illustrating the latch assembly 1 as a door closes with a door jamb, the dead latch 32 moves with the bolt 6 into the sleeve 2 along with the inner sleeve 8 when closing the door. During closing, the door jamb contacts the sloped surface 23 of the bolt 6 opposite the surface of the dead latch 32 to force the bolt 6 into the sleeve 2. Once the door has cleared the door jamb and the bolt 6 is fully inside sleeve 2 as shown in FIG. 5C, the dead latch 32 will begin an activation process shown in FIGS. 5D-5E. FIG. 5D shows the spring return 10 forcing the inner sleeve 8 and bolt 6 back out past the proximal end 50 of sleeve 8. This translation results in corresponding movement of the arm 12 so that the proximal end 61 of the arm 12 near the bolt 6 rises and the distal end 20 lowers at the floating actuator 16. The rising of the proximal end 61 of the arm 12 corresponds to a rise in the blocker 36 which pivots lock lever 40 (about pivot point 42) to be approximately parallel with the dead latch 32. In this position, the blocker 36 extends through the blocker receiver openings 38 when the sleeve 8 translates into alignment with the receiver openings 38, thereby blocking movement of the bolt 6, inner sleeve 8, and arm 12 when activated as seen in FIG. 5E.

FIGS. 6A-6E illustrate how the dead latch function is deactivated during the operation of opening the door. FIG. 6A shows that the lower block 19 (FIG. 5B) has been pushed towards upper block 21 (FIG. 5B) to compress the bias spring 22 and raise the distal end of the arm 12. This results in a corresponding lowering of the proximal end 61 of the arm 12 which lowers the blocker 36 out of the blocker receiver openings 38. The lowering of the blocker 36 also pivots the lock lever 40 about the lever pivot 42, causing the lock lever 40 to no longer be parallel with the dead latch 32. When the lock lever 40 is no longer parallel with the dead latch, the dead latch 32 is free to move with the bolt 6. Furthermore, the inner sleeve 8 is now free to translate within the sleeve 2 against the bias of push spring 14.

Figure 6E:
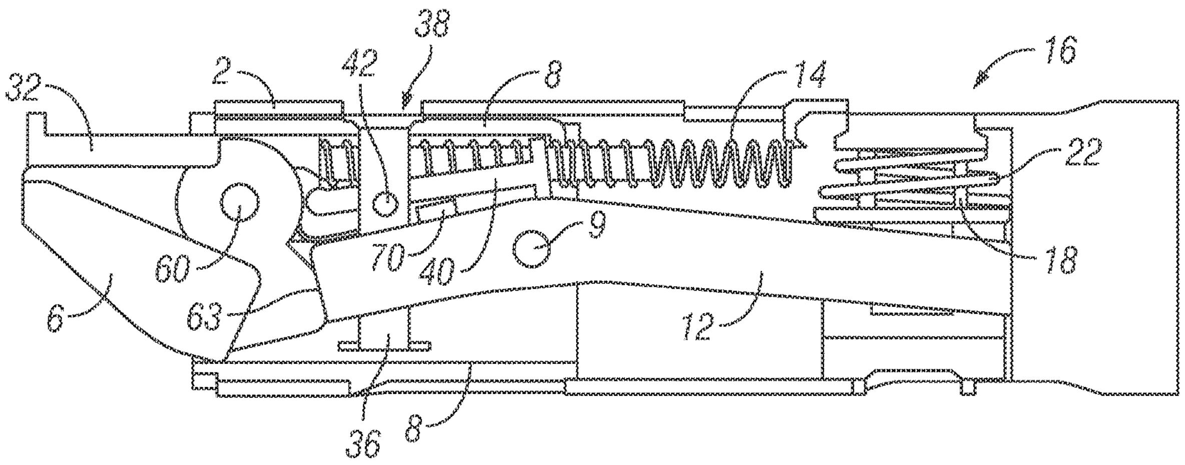
FIG. 6E illustrates the latch assembly of FIG. 6A fully returned to its biased position after the door has been opened.

As can be seen in FIGS. 6B-6C, the bolt 6 can freely rotate and forces exerted on the bolt 6 will force it inside the sleeve 2 as inner sleeve 8 translates towards the floating actuator 16 against the force of the push spring 14. Meanwhile, the blocker 36 remains in an unblocking position allowing the free translation. Once the door jamb plate has been cleared and force is no longer acting to urge the bolt 6 and dead latch 32 inside the sleeve 2, the push spring 14, begins to return the inner sleeve 8 back to its initial position where the push spring 14 is unbiased. FIG. 6E shows the latch assembly with the dead latch 32 returned to its unbiased configuration when the door is opened.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

Examples

Illustrative examples of the latch assembly and method of use disclosed herein are provided below. An embodiment of the latch assembly may include any one or more, and any combination of, the examples described below.

Example 1 is a latch assembly that includes a sleeve, a bolt, and a latch arm. The bolt is movable between a latched position in which the bolt extends out of the sleeve and an unlatched position in which the bolt is substantially inside the sleeve. The latch arm is positioned within the sleeve and includes a blocking surface movable between a blocking position that blocks the bolt from moving from the latched position to the unlatched position and an unblocked position that allows the bolt to move between the latched position to the unlatched position.

In Example 2, the subject matter of Example 1 is further configured such that the bolt is configured to pivot from the latched position, the bolt pivoting about an axis substantially transverse with a longitudinal axis of the sleeve.

In Example 3, the subject matter of Example 2 is further configured such that a bolt pin extends substantially transversely to the longitudinal axis of the sleeve, wherein the bolt is pivotally connected to the bolt pin.

In Example 4, the subject matter of Example 2 is further configured such that The latch assembly of claim 2, further comprises a spring return configured to urge the bolt to pivot towards the latched position.

In Example 5, the subject matter of Example 1 is further configured such that the latch arm pivots between a first position in which the blocking surface is in the blocking position and a second position in which the blocking surface is in the unblocked position.

In Example 6, the subject matter of Example 5 is further configured such that a latch arm pin extends substantially transversely with respect to a longitudinal axis of the sleeve, and the latch arm is pivotally connected to the latch arm pin.

In Example 7, the subject matter of Example 1 is further configured such that an inner sleeve is slidably received by the sleeve, and the inner sleeve interacts with the bolt and slides relative to the sleeve when the bolt is moved between the latched position and unlatched position.

In Example 8, the subject matter of Example 7 is further configured such that a biasing member is configured to urge the inner sleeve into engagement with the bolt.

In Example 9, the subject matter of Example 8 is further configured such that the biasing member naturally urges the bolt into the latched position.

In Example 10, the subject matter of Example 7 is further configured such that the bolt is configured to slideably move within the sleeve.

In Example 11, the subject matter of Example 10 is further configured such that the bolt is configured to pivot from the latched position, and the bolt pivots about an axis substantially transverse with a longitudinal axis of the sleeve.

In Example 12, the subject matter of Example 1 is further configured such that the latch assembly further includes an inner sleeve coupled to the latch arm and a means for preventing unlatching of the bolt. The inner sleeve is configured to slide longitudinally within the sleeve, and the inner sleeve urges the bolt toward the latched position. The means for preventing unlatching of the bolt includes blocking sliding movement of the inner sleeve in the housing.

In Example 13, the subject matter of Example 12 is further configured such that the means for preventing unlatching of the bolt includes a dead latch having a latch blade, a rotatable lever, and a blocker coupled to the latch arm and the rotatable lever. A force exerted on the latch blade results in rotation of the rotatable lever and further results in translation of a portion of the blocker into one or more openings in the inner sleeve to prevent sliding movement of the inner sleeve.

In Example 14, the subject matter of Example 13 is further configured such that the rotatable lever is in an angled position when the dead latch permits movement of the latch, and the rotatable lever rotates so that it is positioned parallel to a longitudinal axis of the housing when the dead latch prevents movement of the latch.

In Example 15, the subject matter of Example 13 is further configured such that the blocker is U-shaped and the rotatable lever includes an opening configured to receive a distal portion of the latch blade there through.

In Example 16, the subject matter of Example 13 is further configured such that the rotatable lever is configured to pivotally rotate about a point where the rotatable lever is attached to the blocker.

Example 17 is a latch assembly including a housing, a bolt, a latch arm, and a means for infinitely adjusting a backset of the latch assembly. The bolt is moveable between a latched position extending out of the housing and an unlatched position in which the bolt is substantially inside the housing. The latch arm is configured to move with the bolt when the bolt moves between the latched and unlatched positions. The means for infinitely adjusting a backset of the latch assembly permits adjustment relative to an elongated slide opening of the housing so that the latch assembly may be installed in a door without a predetermined backset measurement position.

In Example 18, the subject matter of Example 17 is further configured such that the means for infinitely adjusting the backset slides along the latch arm along a predetermined path so that the backset can be adjusted to any position along the predetermined path.

In Example 19, the subject matter of Example 17 is further configured such that the means for infinitely adjusting the backset includes a floating latch actuator coupled to the latch arm and to the elongated slide opening in the housing, wherein the floating latch actuator is aligned with the elongated slide opening.

Example 20 is a method of operating a latch assembly. The method includes the step of providing a latch assembly installed on a door, the latch assembly including a bolt moveable between a latched position and an unlatched position, and the latch assembly further including a latch arm movable between a first position that blocks pivoting of the bolt and a second position that does not block pivoting of the bolt. The method further includes moving the latch arm from the first position to the second position by rotating a door handle. The method further includes pivoting the bolt away the latched position and moving the bolt to the unlatched position by opening the door.

The invention claimed is:

1. A latch assembly comprising:

a housing having a first end and an opposite second end defining a longitudinal axis, wherein at least one opening is defined within the housing proximate the second end;

a bolt disposed at the first end of the housing, the bolt selectively movable between at least an extended position and a retracted position, wherein in the extended position, the bolt extends at least partially out of the first end of the housing, and in the retracted position, the bolt substantially retracts into the first end of the housing;

a latch arm having a first end and an opposite second end extending along the longitudinal axis and disposed within the housing; and a latch actuator disposed proximate the second end of the housing, the latch actuator including a receiver rotatable around a transverse axis orthogonal to the longitudinal axis and configured to receive a torque blade of a door handle and receive the second end of the latch arm, the receiver being in open communication with the at least one opening of the housing, wherein upon rotation of the receiver, the latch actuator moves the latch arm such that the first end of the latch arm is selectively engageable with the bolt, and wherein the receiver is slidingly coupled to the second end of the latch arm and the latch actuator is movable along the longitudinal axis relative to the first end of the housing such that a backset position of the receiver is adjustable along a length of the latch arm.

2. The latch assembly of claim 1, wherein the receiver is movable along the transverse axis between at least a first position and a second position upon rotation of the torque blade, and wherein in the first position, the receiver positions the second end of the latch arm such that the first end of the latch arm engages with the bolt, and in the second position, the receiver positions the second end of the latch arm such that the first end of the latch arm disengages from the bolt.

3. The latch assembly of claim 2, wherein the latch arm is pivotably mounted within the housing.

4. The latch assembly of claim 2, wherein the latch actuator further includes a bias member biasing the receiver towards the first position.

5. The latch assembly of claim 4, wherein the latch actuator further includes a cam member fixed relative to the transverse axis and configured to interact with the receiver such that the receiver slides along the transverse axis upon rotation of the receiver.

6. The latch assembly of claim 1, wherein movement of the receiver and the latch arm does not directly move the bolt from the extended position towards the retracted position.

7. The latch assembly of claim 1, wherein the at least one opening is elongated along the longitudinal axis and has a front end and an opposite rear end, and wherein the ends of the at least one opening define forward and rearward backset stops of the latch assembly, the backset position of the receiver variably positionable at any intermediate point between the forward and rearward backset stops.

8. The latch assembly of claim 7, wherein the latch actuator freely floats within the housing along the longitudinal axis relative to the at least one opening.

9. The latch assembly of claim 1, wherein the housing includes a sleeve and a cartridge, the cartridge defining the at least one opening, and wherein the sleeve is slidable with respect to the cartridge so as to define the backset position.

10. The latch assembly of claim 1, wherein when the bolt moves between the extended position and the retracted position, the second end of the latch arm longitudinally slides relative to the receiver.

11. A latch assembly comprising:

a housing having a first end and an opposite second end defining a longitudinal axis, wherein at least one opening is defined within the housing proximate the second end;

an inner sleeve disposed within the housing proximate the first end and slidable along the longitudinal axis;

a bolt pivotably coupled to the inner sleeve, the bolt selectively movable between at least an extended position and a retracted position, wherein in the extended position, the bolt extends at least partially out of the first end of the housing, and in the retracted position, the bolt substantially retracts into the first end of the housing;

a latch arm having a first end and an opposite second end extending along the longitudinal axis and disposed within the housing; and a latch actuator disposed proximate the second end of the housing and aligned with the at least one opening, wherein the latch actuator is movable along the longitudinal axis relative to the first end of the housing such that a backset position of the latch assembly is adjustable, the latch actuator including a receiver rotatable around a transverse axis orthogonal to the longitudinal axis and configured to receive a torque blade of a door handle and receive the second end of the latch arm, wherein based on a rotational position of the receiver, the first end of the latch arm is selectively engageable with the bolt to prevent the bolt from pivoting.

12. The latch assembly of claim 11, wherein the bolt has a flat surface and an opposite angled surface, wherein when a force contacts the angled surface of the bolt, the bolt slides longitudinally within the housing so as to move towards the retracted position while the latch arm is engaged with the bolt and the second end of the latch arm slides relative to the receiver.

13. The latch assembly of claim 11, wherein the bolt has a flat surface and an opposite angled surface, wherein when a force contacts the flat surface of the bolt, the bolt pivots and slides longitudinally within the housing so as to move towards the retracted position only if the position of the receiver has disengaged the first end of the latch arm from the bolt.

14. The latch assembly of claim 11, wherein the latch actuator further includes a bias member and a cam member, the bias member and the cam member cooperating to move the receiver along the transverse axis for engaging and disengaging the latch arm from the bolt.

15. The latch assembly of claim 11, wherein the at least one opening is elongated along the longitudinal axis and the latch actuator freely floats along the longitudinal axis within the housing relative to the at least one opening.

16. The latch assembly of claim 11, wherein the housing includes a sleeve and a cartridge, the cartridge defining the at least one opening, and wherein the sleeve is slidable with respect to the cartridge so as to define the backset position.

17. A handle assembly comprising:

at least one handle;

a torque blade coupled to the at least one handle and rotatable around a first axis via the at least one handle; and a latch assembly comprising:

a housing having a first end and an opposite second end defining a second axis orthogonal to the first axis, wherein at least one opening is defined within the housing proximate the second end;

a bolt disposed at the first end of the housing, the bolt selectively movable between an extended position and a retracted position, wherein in the extended position, the bolt extends at least partially out of the first end of the housing, and in the retracted position, the bolt substantially retracts into the first end of the housing;

a latch arm having a first end and an opposite second end extending along the second axis and disposed within the housing; and a latch actuator having a receiver aligned with the at least one opening of the housing, the receiver coupled to the torque blade and rotatable around the first axis, the receiver also coupled to the second end of the latch arm, wherein upon rotation of the at least one handle, the latch actuator moves the latch arm such that the first end of the latch arm is selectively engageable with the bolt, and wherein the receiver is slidingly coupled to the second end of the latch arm and the latch actuator is movable along the second axis relative to the first end of the housing such that a backset position of the receiver is adjustable along a length of the latch arm.

18. The handle assembly of claim 17, wherein rotation of the at least one handle around the first axis does not move the bolt from the extended position towards the retracted position.

19. The handle assembly of claim 17, wherein the latch actuator further includes a bias member and a cam member, the bias member and the cam member cooperating to move the receiver along the first axis for engaging and disengaging the latch arm from the bolt.

* * * * *